Figure 1:
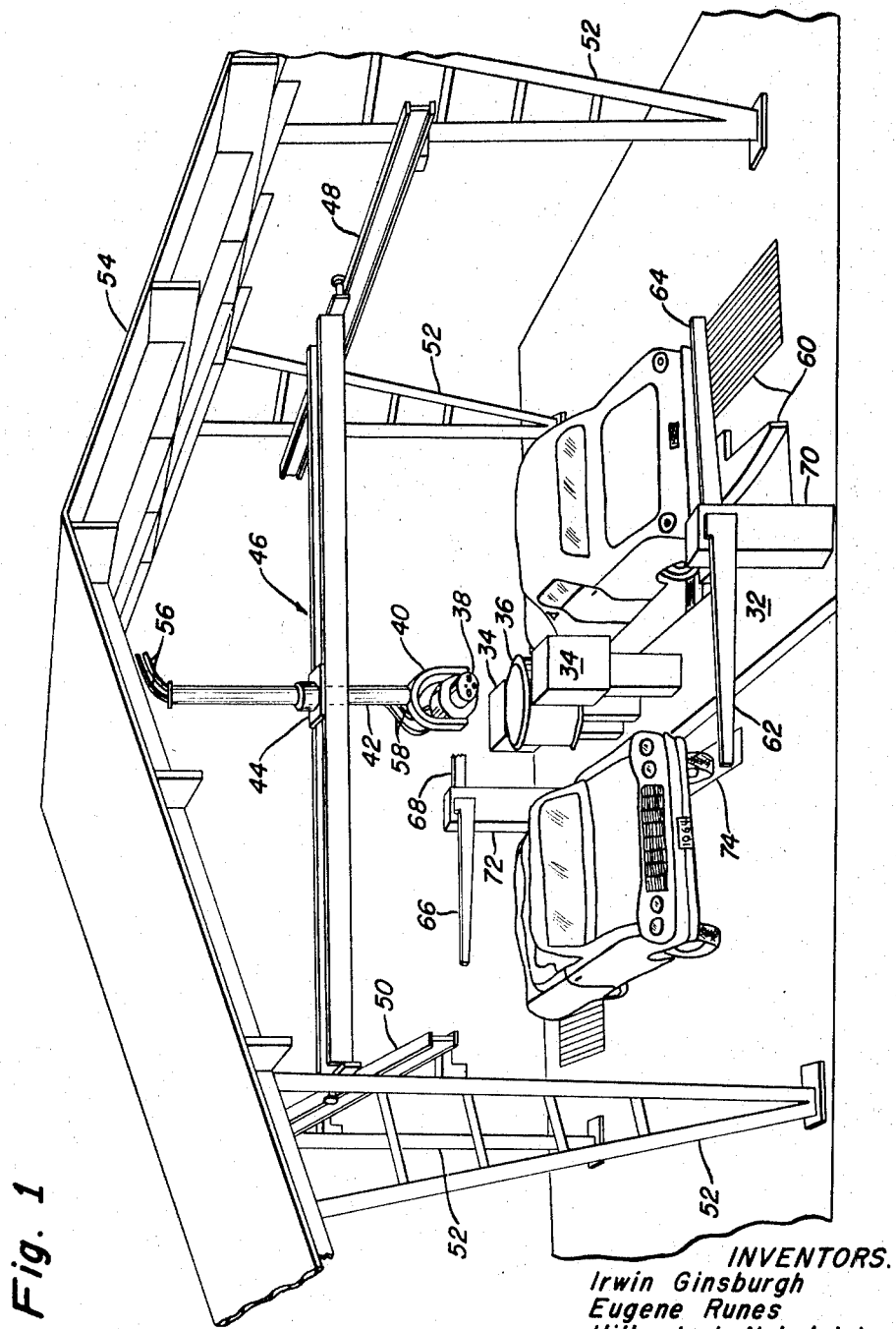

July 9, 1968

I. GINSBURGH ET AL 3,391,651

VEHICLE POSITIONING APPARATUS

Filed March 19, 1965

2 Sheets-Sheet 1

INVENTORS.
Irwin Ginsburgh
Eugene Runes
Hilbert J. Nebelsiek
Richard A. Sholts

BY

ATTORNEY

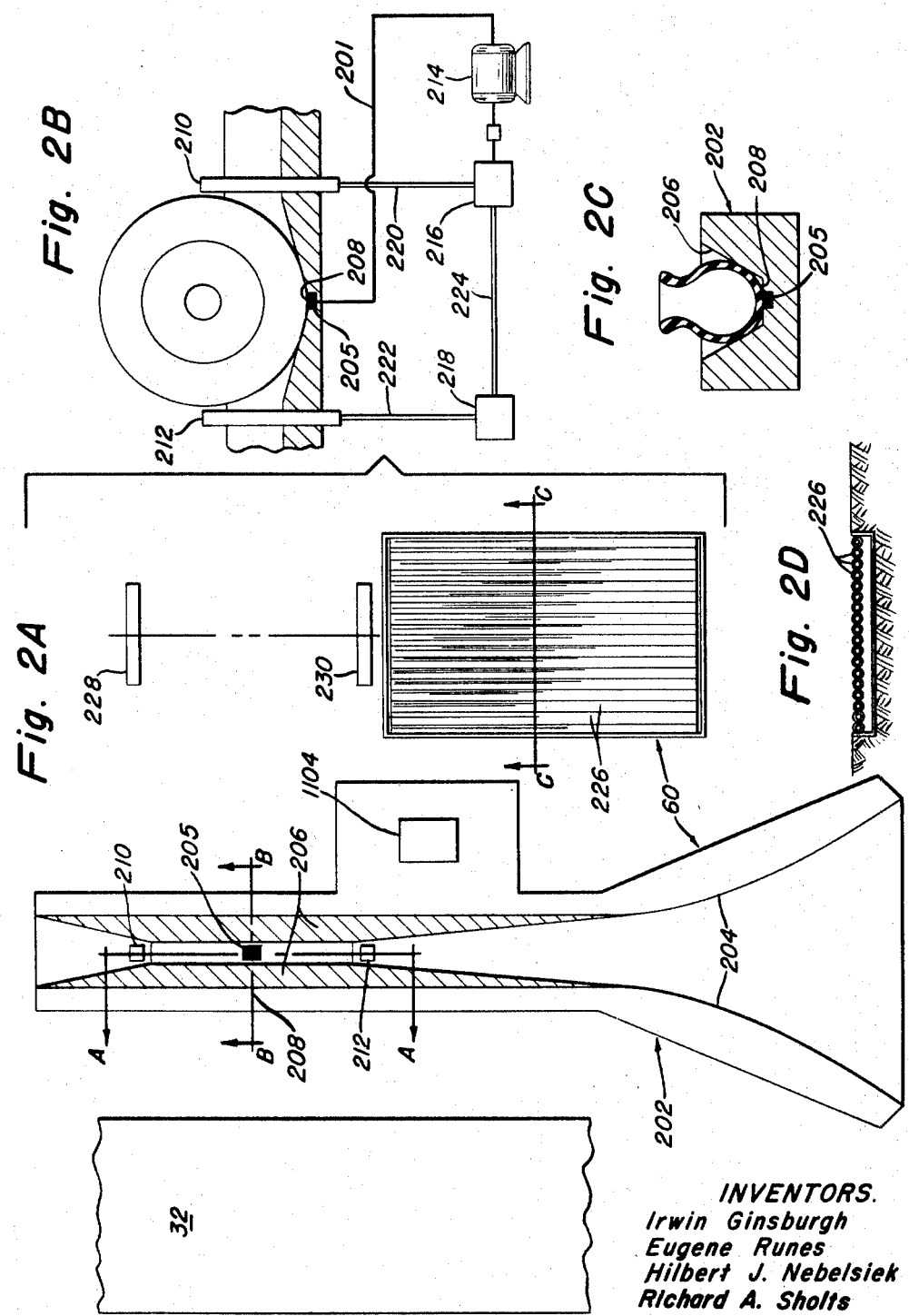

United States Patent Office 3,391,651
Patented July 9, 1968

3,391,651
VEHICLE POSITIONING APPARATUS
Irwin Ginsburgh, Morton Grove, and Eugene Runes, Chicago Heights, Ill., and Hilbert J. Nebelsick, Highland, and Richard A. Sholts, Munster, Ind., assignors to Standard Oil Company, Chicago, Ill., a corporation of Indiana
Filed Mar. 19, 1965, Ser. No. 441,248
9 Claims. (Cl. 104—242)

This invention relates to positioning an automotive vehicle with respect to a reference location, and, more particularly, it is concerned with apparatus for positioning an automobile or the like in a system for automatically fueling such a vehicle at a retail gasoline or fuel oil station.

In co-pending application for United States Letters Patent Ser. No. 410,913, filed Nov. 13, 1964, there is disclosed a system for automatically fueling automotive vehicles, such as conventional automobiles characteristically provided with a fuel tank, an inlet to the tank, a gas cap for preventing spillage or evaporation of fuel from the tank, and generally, but not always, with a flap which conceals the tank inlet.

The above system comprises vehicle locating means adapted to correctly position the vehicle with respect to the refueling system. The vehicle locating means may also include means for automatically ascertaining the position of the vehicle relative to the refueling system if the vehicle positioning means is designed to permit variations in the lateral, longitudinal or vertical position of the vehicle. Typically, the vehicle is provided with four wheels, e.g., aligned front and rear wheels on either side of the vehicle in substantially parallel relationship. After the vehicle has been correctly positioned, the vehicle is identified by any of several means in terms of its model year, manufacturer (e.g., Plymouth, Chevrolet, Ford), model and body style. Based upon the identification of the automobile in such terms, the machine automatically and without human assistance guides a fuel dispensing head adjacent to the fuel tank inlet of the automobile. The fuel dispensing head carries a cap-removal means adapted to remove the gas cap from the fuel tank inlet, and at least one extendible and retractable nozzle connected to a flexible conduit or hose through which the fuel is pumped into the vehicle's fuel tank. Generally, the dispensing head also carries a flap-opening means adapted to open the flap, which permits access through the body shell to the fuel tank inlet.

After the dispensing head has been positioned opposite the fuel tank inlet, the flap-opening means opens the flap and restrains it if necessary, the cap-removal means removes the gas cap from the inlet, and retains it, and the nozzle is extended into the gasoline tank inlet. All of these operations are performed automatically based upon programmed instructions peculiar to the model year, manufacturer, model and body style of the vehicle being refueled.

After the nozzle has been properly positioned, fuel is pumped into the vehicle's fuel tank. As described hereinafter, the amount of fuel so pumped may be based upon a specified volume, a specified monetary value, or until the fuel tank is full. After the pumping operation is complete, the machine automatically withdraws the nozzle from the inlet, replaces the cap, returns the flap to its normal position, and withdraws the dispensing head away from the vehicle. Optionally, means are provided to release the automobile from its position and to signal the driver that the refueling operation is complete.

To aid in understanding the above-mentioned fueling system, reference is now made to FIGURE 1, which is an isometric schematic view of a refueling station equipped with the automatic dispensing equipment described herein. FIGURE 1 shows two automobiles in position for refueling on each side of an island 32 (as that term is used in the gasoline retailing business) upon which is disposed two typical gasoline pump stands 34. In between the pumps is a console 36 which bears a number of buttons or switches, as hereinafter described, through which the driver of the automobile exchanges with the apparatus information regarding the identification of the automobile in terms of its model year, manufacturer, model and body style, and the type and amount of fuel desired.

Above console 36 is dispensing head 38 suspended in yoke 40 from vertical elevator 42. Elevator 42 is carried by, and extends above, carriage 44 which is supported by and traverses along bridge 46, which in turn is supported by and traverses along crane rails 48 and 50. Posts 52 support the crane rails and also support optional roof 54. Two fuel hoses 56 are shown entering the top of elevator 42 and lead into the elevator from fuel pumping means not shown, which draws fuel from a fuel storage tank, also not shown. Flexible hoses 58 lead from the base of elevator 42 into the rear end of dispensing head 38.

Dispensing head 38 carries flap-opening means, gas cap-removal means and nozzle projection means, which are merely schematically illustrated in FIGURE 1 by the small circles on the face of dispensing head 38. When dispensing head 38 is centered above island 32 as shown in FIGURE 1, it is in its neutral position with respect to each automobile.

Lateral and longitudinal vehicle positioning means 60 are constructed into the grade surface of the refueling station. A detector such as pressure sensing plate 74 detects that the automobile has advanced until the left front wheel rests on the plate.

Barrier gates 62, 64, 66 and 68 are mounted on barrier posts 70 and 72, respectively, at each end of island 32, and function to direct automobiles to the proper side of island 32. Gates 64 and 66 normally are open when no automobiles are being serviced, but close after an automobile drives in to be serviced. Gates 64 and 66 keep the automobile next in line for service from moving in close so that there is sufficient clearance for dispensing head 38 to operate properly. Gates 62 and 68 are raised when the servicing operation is complete.

Because of the automatic character of the process and device, the diversity, in terms of model year, manufacturer, model and body style, of the automobiles currently used by the motoring public, and the diversity of locations on such automobiles of the fuel tank inlet, it is necessary to locate each automobile with respect to the over-all apparatus prior to starting the refueling operation. The position of the automobile with respect to the apparatus may be approximate, being merely with a certain range of lateral and longitudinal distances from reference points, or it may be fairly precise, to a tolerance of about plus or minus ¼ inch in each direction measured from appropriate reference positions on a car as later described. If the automobile positioning is only approximate, it is necessary to provide the apparatus with means to measure for each individual vehicle to be refueled the distance from fixed reference points to the vehicle, and to design the hereinafter described dispenser head positioning means to compensate for the variations in such distances. Because of the added complexity necessarily required of the apparatus when the vehicle positioning means is designed for only approximate accuracy, we consider it advantageous to design such means to position the vehicle with greater precision, illustratively to a tolerance of plus or minus ¼ inch laterally and longitudinally.

The present invention involves vehicle positioning apparatus which may be employed in the fueling system mentioned above to correctly position the vehicle to be fueled with respect to the fuel dispensing apparatus. Briefly, the present invention provides an elongated trough-like lateral guide means located adjacent a reference location in a surface over which a vehicle is driven and adapted to engage with a wheel on one side of said vehicle; an elongated, friction-reducing bearing surface spaced from said guide means and substantially parallel thereto to engage with a wheel on the other side of said vehicle and to permit said vehicle to move laterally in response to force exerted laterally by said guide means on the wheel engaged therewith; detector means adjacent said guide means to detect the presence of a selected one of the wheels of said vehicle in a desired location; and movable wheel barrier means adjacent said guide means, said barrier means being responsive to a signal from said detector means to restrain the movement of said vehicle after being positioned.

A simple, effective longitudinal vehicle positioning means is a saucer-like or V-shaped trough-like lateral guide means, either formed in the surface of the service station driveway or in a ramp over which the automobile is driven, and into which the left rear wheel, or both rear wheels, come to rest. The presence of the rear wheel or wheels in such a trough may be detected by a pressure sensitive mechanism. The degree of accuracy of longitudinal positioning need not be extreme; a tolerance of plus or minus ¼ inch from a vertical plane drawn through the axis of the rear axle is acceptable. Advantageously, to assure that the rear wheels rather than the front wheels are in the trough, means may be provided to detect, prior to starting the refueling operation, if the front wheels or the major portion of the automobile are forward of the rear axle trough. Such detection may be done in many ways, such as photoelectrically or with pressure sensitive mechanical means.

The vehicle positioning means also includes means to position the automobile laterally with respect to the over-all apparatus. Although the precision required for laterally spacing the automobile is not great, being again about plus or minus ¼ inch, it is desirable to have some part of the automobile positioned at a known lateral distance from the apparatus. The particular part of the automobile selected as a reference for lateral spacing may be any part, such as the body shell, but most suitably is the left rear tire. Use of the left rear tire permits establishing as a plane of reference the vertical plane perpendicular to the rear axle and passing through the center of the tire.

A suitable means for laterally positioning the vehicle are converging smooth guide rails or curbs acting against the tires on one side of the automobile. Optionally, one such guide rail may be spring loaded to gently urge the tires against the opposing rail. Alternatively, an appropriately contoured shallow depression in the driveway surface may be used as a lateral positioning guide means. The guide means should be of a length suitable to properly align the vehicle and may engage only with a front wheel initially and then a rear wheel when the vehicle is positioned in place. Or, the guide means may be of a length suitable to engage with both the front and rear wheels to insure better alignment of the vehicle. To permit the automobile to be moved sideways readily in response to the guide rail or curb, long freely rotatable rollers are disposed parallel with the path of the automobile and underneath the path of the wheels on the opposite side of the automobile. If desired, similar rollers may be placed longitudinally in the bottom of the lateral positioning guide means to facilitate lateral movement of the vehicle. It is to be understood that various alternative friction-reducing bearing surfaces may be found desirable for use in lieu of the aforementioned rollers. For example, a flat plate on rollers might be found desirable.

A preferred embodiment of the apparatus of the present invention is set out in the following annexed figures which form a part of this specification:

FIGURE 1 is an isometric schematic over-all view of a refueling station equipped with the automatic dispensing equipment described above.

FIGURE 2A is a schematic plan view of the lateral and longitudinal vehicle positioning means 60. FIGURE 2B is a schematic elevation view of Section A—A of FIGURE 2A. FIGURE 2C is an elevation view of Section B—B of FIGURE 2A. FIGURE 2D is an elevation view of Section C—C of FIGURE 2A.

Throughout the figures, means for fastening (by screws, bolts, welds, etc.) together the various elements have been omitted for the sake of clarity and ease of understanding. Also, bearings have generally not been numbered, and in some instances not shown, their need and location being within the scope of established mechanical engineering skill.

Previously described, FIGURE 1 discloses an over-all view of the dispensing apparatus, and does not require further description at this point. The elements of the system which are first used when an automobile approaches for refueling are lateral and longitudinal vehicle positioning means 60, shown in schematic plan view in FIGURE 2A. Adjacent to island 32 is converging trough 202. At its entrance end, trough 202 has vertical sides 204. At its center, the trough has sloping sides 206, which are shown cross-hatched for clarity and which in lateral cross-section form a truncated V. The center portion of the base (or tire-bearing surface) of the trough is provided with a shallow V, or notch 200 transverse to the trough, the apex of which is at line 208. Wheel barriers 210 and 212 are disposed at each end of the shallow V portion and are adapted to be projected upward.

FIGURE 2B is a schematic elevation view of Section A—A of FIGURE 2A, and shows apex 208 of the shallow V as well as wheel barriers 210 and 212 projected upward above the bottom of trough 202, thus preventing movement of the wheel centered above the apex. Wheel barriers 210 and 212 are raised and lowered in response to operation of motor 214 through angle gear reducers 216 and 218 and screw jacks 220 and 222. The angle reducers are mechanically connected through linkage 224.

FIGURE 2C is an elevation of Section B—B from FIGURE 2A, showing the sloping sides 206 and apex line 208 of trough 202. The outline of a section of a tire as it fits into the trough is illustrated schematically.

Returning now to FIGURE 2A, a plurality of long, thin rollers 226 are shown to the right of trough 202. Right wheel barriers 228 and 230 are aligned opposite left wheel barriers 210 and 212 and forward of rollers 226. A shallow V or notch for the right rear wheel may also be disposed between barriers 228 and 230 corresponding to the shallow V or notch for the left rear wheel between barriers 210 and 212.

FIGURE 2D is an elevation view of Section C—C of FIGURE 2A, and shows the plurality of rollers 226.

When an automobile drives in for refueling, its left front wheel is driven through trough 202 as the right front wheel passes over rollers 226. As the left front wheel enters trough 202, it is centered in the trough by means of converging sides 204, and further centered by means of sloping sides 206. Rollers 226 underneath the right front wheel permit the latter to move sideways in response to the compulsion exerted by sides 204 and 206 on the left front wheel. In a similar way, as the left rear wheel is center in trough 202 the right rear wheel moves freely over rollers 226 in either direction as needed to align the automobile. Positioning of the automobile is completed when the left rear wheel is nestled in the V-shaped portion of trough 202, with the rear axle centered above apex line 208. As soon as the customer has initiated the refueling operation, wheel barriers 210, 212, 228, and 230 are automatically projected upward to restrain movement of the automobile during refueling. Right wheel barriers 228 and 230 are wider than rear left wheel barriers 210 and 212 in order to accommodate the variations in track width of various types of automobiles.

A wheel detector 205 is positioned in trough 202, preferably at the apex 208 of notch 200, to detect the pressure of the left rear wheel in the trough when the vehicle is properly positioned. The detector may be a pressure sensitive switch of the type commercially available, or it may be one or more small orifices through which is passed air or the like so that the presence of a wheel over the detector restricts the flow of the air. Detector 205 is connected by conductor 201 to motor 214 so that when the presence of a wheel is detected an electric signal is produced and motor 214 is actuated to raise the wheel barriers mentioned above. Preferably, a second detector 74 is employed to detect the presence of the left front wheel, as shown in FIGURE 1. This insures that the vehicle is properly positioned longitudinally in the apparatus. Both detectors may operatively be connected to the front and rear wheel barriers, if desired.

Thus, when the vehicle is properly positioned with the left rear wheel in groove 200, detector 205 produces a signal to raise the wheel barriers and, when the driver of the vehicle initiates the fueling operation, the wheel barriers are raised.

After the automobile has been positioned, the left front window is opposite the console, convenient for the driver to exchange with the apparatus information relative to the description of the automobile and amount of fuel desired. Upon initiating the fueling operation, the barrier gates are lowered, the wheel barriers are raised, the dispensing head moves into place and the dispensing operation is conducted as mentioned above. When the servicing is completed, the dispensing head moves away from the vehicle, the barrier gates are raised and the wheel barriers are lowered to permit the vehicle to be driven away.

Having thus described the invention, what is claimed is:

1. Apparatus for positioning a multi-wheeled vehicle with respect to a reference location, which apparatus comprises:
    an elongated trough-like lateral guide means located adjacent the reference location in a surface over which said vehicle is driven and adapted to engage with a wheel on one side of said vehicle;
    an elongated friction reducing bearing surface spaced from said guide means and substantially parallel thereto to engage with another wheel on the other side of said vehicle and causing said vehicle to move laterally in response to force exerted laterally by said guide means on the wheel engaged therewith;
    detector means located within said guide means to detect the presence of a selected one of the wheels of said vehicle in a desired location; and
    movable wheel barrier means adjacent said guide means responsive to a signal from said detector means to restrain the movement of said vehicle after the vehicle is positioned.

2. Apparatus for positioning a multi-wheeled vehicle with respect to a reference location, which apparatus comprises:
    an elongated trough-like lateral guide means located adjacent said reference location in a surface over which said vehicle is driven and adapted to receive a wheel on one side of said vehicle;
    an elongated roller bearing surface spaced from said guide means and substantially parallel thereto to engage with a second wheel on the other side of said vehicle and permitting said vehicle to move laterally in response to force exerted laterally by said guide means on the wheel engaged therewith;
    a wheel receiving notch positioned in said guide means transverse thereto to receive a wheel engaged with said guide means;
    detector means located within said guide means to detect the presence of a selected one of the wheels of said vehicle in a desired location; and
    movable wheel barrier means adjacent said guide means and connected to said detector means to receive a signal therefrom so as to actuate said wheel barrier means and restrain the movement of said vehicle after the vehicle is positioned.

3. The apparatus of claim 2 wherein said lateral guide means comprises a trough member provided with converging sidewalls on the entrance end thereof and parallel sidewalls near the central portion thereof, said sidewalls being horizontally sloped toward the longitudinal axis of said guide means.

4. The apparatus of claim 2 wherein said roller bearing surface comprises a plurality of elongated rotatable roller members disposed in a parallel relationship to said lateral guide means.

5. The apparatus of claim 2 wherein said notch is positioned in the bottom of said trough member.

6. The apparatus of claim 2 wherein said detector means comprises at least one pressure sensitive means positioned in said guide means to be contacted by a rear wheel of said vehicle.

7. The apparatus of claim 5 wherein said detector means is positioned in the bottom of said notch.

8. The apparatus of claim 2 wherein said wheel barrier means comprise two vertically movable barriers spaced apart and positioned in said guide means.

9. The apparatus of claim 8 wherein said notch is positioned in the bottom of said guide means between said barriers.

References Cited

UNITED STATES PATENTS

| | | | |
|---|---|---|---|
| 1,504,558 | 8/1924 | Hawley | 104—44 |
| 2,846,088 | 8/1958 | Porter | 238—4 |

EUGENE G. BOTZ, *Primary Examiner.*

D. F. WORTH, *Assistant Examiner.*